T. H. CUDDY.
STEERING DEVICE FOR TRACTION ENGINES.
APPLICATION FILED FEB. 8, 1913.
1,114,586.
Patented Oct. 20, 1914.
3 SHEETS—SHEET 1.
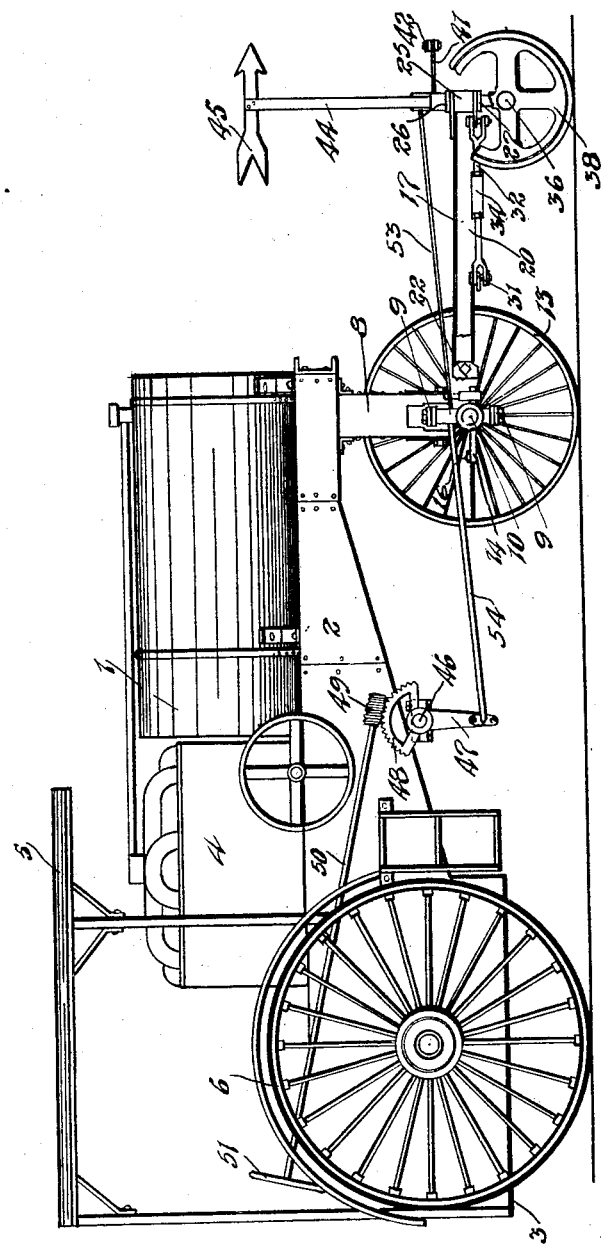

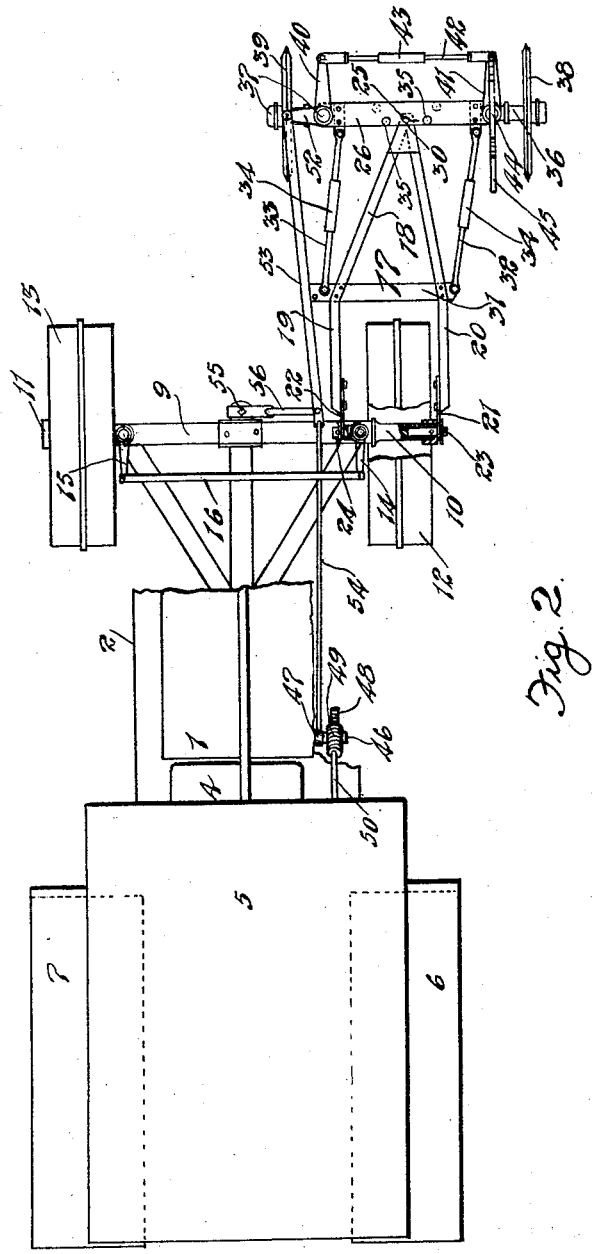

T. H. CUDDY.
STEERING DEVICE FOR TRACTION ENGINES.
APPLICATION FILED FEB. 8, 1913.
1,114,586.
Patented Oct. 20, 1914.
3 SHEETS—SHEET 3.
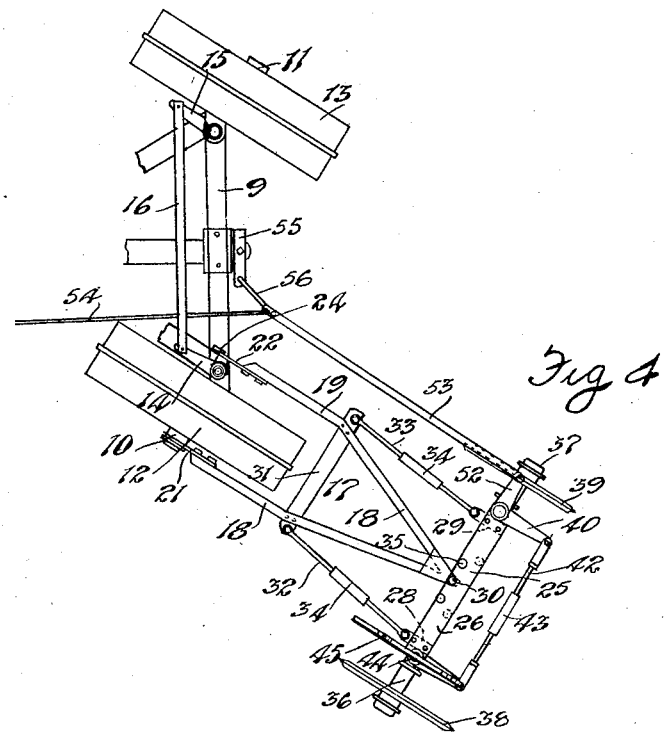
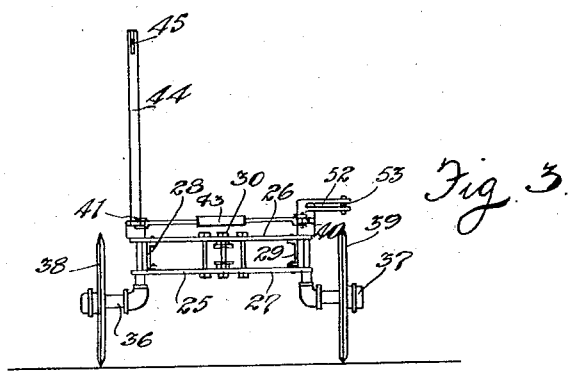

UNITED STATES PATENT OFFICE.

THOMAS HUGHES CUDDY, OF WINNIPEG, MANITOBA, CANADA.

STEERING DEVICE FOR TRACTION-ENGINES.

1,114,586.  Specification of Letters Patent.  Patented Oct. 20, 1914.

Application filed February 8, 1913. Serial No. 747,043.

*To all whom it may concern:*

Be it known that I, THOMAS HUGHES CUDDY, of the city of Winnipeg, in the Province of Manitoba, Canada, have invented certain new and useful Improvements in Steering Devices for Traction-Engines, of which the following is the specification.

The invention relates to a steering device for traction engines and the object of the invention is to supply an improved means for guiding the front wheels of a traction engine, the device being particularly adaptable to those traction engines which have the front wheels independently pivotally connected to a stationary front axle.

A further object of the invention is to supply a means which will render it absolutely impossible for the steering device to turn the front wheels to which it is connected more than a set distance thereby avoiding any possibility of damaging the traction engine through too sharp a turn being made.

A still further object of the invention is to provide a steering device with a pair of forward guide wheels one of which can be adjusted in respect to the other and a still further object is to provide a steering device which can be controlled from the traction engine when desired.

With the above objects in view the invention consists essentially in the arrangement and construction of parts hereinafter more particularly described and later pointed out in the appended claims.

Figure 1 is a side view of a traction engine supplied with my steering device, one of the carriage wheels being removed and parts broken away to expose construction. Fig. 2 is a plan view of the same parts being broken away to expose construction. Fig. 3 is a front view of the steering device. Fig. 4 is a plan view of the steering device and front wheels of a traction engine showing the position certain parts have when the front wheels are turned to the extreme position.

In the drawings like characters of reference indicate corresponding parts in each figure.

1 represents a traction engine of which 2 is the frame, 3 the platform, 4 an internal combustion engine and 5 the usual canopy or top which covers over the engine and platform. The frame is carried rearwardly by the traction wheels 6 and 7 and forwardly by the bolster 8 which is secured permanently to the cross axle 9, which axle has the ends thereof forked in the usual way receiving pivotally stub axles 10 and 11 supplied with carriage wheels 12 and 13. Arms 14 and 15 extend rearwardly from the stub axles and are connected by a cross bar 16 in the usual way, this construction being such that when one of the carriage wheels is turned the other is turned a similar amount by the action of the bar. The above parts are of ordinary construction and are simply described to show how my device is applied.

17 represents my steering device which is now described in detail.

18 is a more or less V-shaped frame formed from a pair of bars 19 and 20 connected together forwardly and having the rear ends supplied with extending plates 21 and 22, the plate 21 being held to the outer end of the axle 10 by means of a pin 23 while 22 is fastened to the inner end of the axle 10 by means of a pin 24, the bars 19 and 20 in this way spanning the axle.

25 is a cross beam formed from a top and bottom bar 26 and 27 spaced apart by a pair of short channel irons 28 and 29. The forward end of the frame 18 is passed between the plates 26 and 27 and fastened to the same by a vertically disposed pin 30.

31 is a brace bar connected permanently to the frame 18 and 32 and 33 are brace rods passing between the ends of the brace bar and the channel irons 28 and 29. These rods are supplied with turnbuckles 34 so that they can be adjusted.

The beam 25 carries a number of bolts 35 arranged to the side of the bolt 30 which bolts are supplied so that the beam can be adjusted in respect to the frame 18. This is done by withdrawing the bolt 30 and fastening the frame to the beam by one or other of the bolts 35. When this is done the turnbuckles 34 will need to be adjusted to line up the beam with the axle 10. The beam carries at the ends a pair of swiveled axles 36 and 37 supplied with guide wheels 38 and 39.

Arms 40 and 41 extend forwardly from the swiveled axles and are connected by a cross rod 42 supplied with a turn-buckle 43. Although I have shown a turnbuckle in this instance it will be understood that any other suitable adjusting means could be employed to equal advantage.

A post 44 extends upwardly from the axle 36 and is fitted with a pointer 45.

46 is a short shaft mounted in a suitable bearing carried by the frame 2 and provided at one end with a downwardly directed crank 47 and at the other end with a partial worm wheel 48 which meshes with a worm 49 located at the end of a steering post 50 fitted with a steering wheel 51, the steering wheel being positioned within convenient range of the attendant whom it will be understood rides on the platform.

52 is a lever permanently secured to the axle 37 and carrying a bar 53 connected through a link 54 with the lower end of the crank 47. According to this construction it will be seen that the attendant can steer the guide wheels by turning the steering wheel 51.

55 is a plate permanently secured centrally to the front axle 9 and fitted with a pivoted rod 56 pivotally secured to the bar 53.

The device is particularly useful in steering a traction engine when the engine is pulling a number of plows. Once a furrow is cut the steering device will steer the traction engine, this being accomplished by placing one of the wheels, 38 in the furrow. This wheel will follow the furrow and accordingly direct the traction engine. However if the attendant desires at any time to steer the traction engine himself he can do so by manipulating the hand wheel 51. It is found advantageous in some instances to have the wheels 38 and 39 disposed at an angle to each other and for this purpose the rod 42 has been made adjustable.

In order to prevent the steering device from turning the front wheels of the traction engine farther than a set distance I have supplied the rod 56 and its action will be clearly understood if reference be made to Fig. 4 of the drawings. In this figure the steering device has been turned approximately through an angle of 45 degrees. In this position of the steering device it will be seen that the bar 53 and the rod 56 are practically alined and further when they are so alined the guide wheels are parallel with the carriage wheel 12. Consequently the traction engine in this instance cannot turn a sharper angle than 45 degrees.

The limiting angle to which the carriage wheels can be turned can be varied by designing the rod 56 so that it will pull the axles 36 and 37 in alinement with the beam 25 when the limiting angle has been reached.

I have found in most traction engines that the front wheels are arranged so that they cannot be turned much more than 45 degrees and for this reason I have chosen this as an example in the above explanation.

Where one is using the traction engine with the steering device for plowing in soft or level land it will be found advantageous to adjust the wheel 39 at an angle to the wheel 30, the wheel 39 being positioned so that it will have a tendency, as the tractor advances to draw the wheel 38 toward the land side of the furrow in which it is running. This is a very important feature of the steering device as in certain kinds of land I have found it almost impossible with parallel wheels to keep the wheel 38 in the furrow. In rough land the wheel 39 is run straight and the wheel 38 is angled in toward the furrow.

What I claim as my invention is:

1. The combination with a traction engine having the front end thereof mounted on pivoted carriage wheels and provided with means connecting the carriage wheels and causing the same to turn together and in the same direction, and a steering device located in advance of one of the wheels and connected to the same rearwardly and having the forward end thereof mounted on pivoted carriage wheels, the said carriage wheels being connected to operate together, of steering means operated from the engine controlling one of the carriage wheels, and means coöperating with said steering means limiting the angle to which said steering device can be turned, as and for the purpose specified.

2. The combination with a traction engine having the front end thereof mounted on pivoted carriage wheels and provided with means connecting the carriage wheels and causing the same to turn together and in the same direction, and a steering device located in advance of one of the wheels and connected to the same rearwardly and having the forward end thereof mounted on pivoted carriage wheels, the said carriage wheels being connected to operate together, of a lever secured to the axle of one of the carriage wheels, a bar secured to the lever and extending rearwardly toward the traction engine, means for advancing or receding the bar, said means being controlled from the traction engine and a rod pivotally secured to the rear end of the bar and to the engine, as and for the purpose specified.

3. The combination with a traction engine having the front end thereof mounted on pivoted carriage wheels and provided with means connecting the carriage wheels and causing the same to turn together and in the same direction and a steering device located in advance of one of the wheels and connected to the same rearwardly and having the forward end thereof mounted on pivoted carriage wheels, the said carriage wheels being connected to operate together, of a lever secured to the axle of one of the carriage wheels, a bar secured to the lever and extending rearwardly toward the traction engine a link connected to the rear end of the bar, a short shaft rotatably mounted on the engine and provided with a crank and a partial worm wheel, said crank being connected to the link aforesaid, a steering post mounted on the engine and provided with a hand wheel and a worm, said worm meshing with the worm wheel and a rod pivotally secured to the rear end of the latter bar and to the front end of the traction engine, as and for the purpose specified.

Signed at Winnipeg this 26th day of July 1912.

THOMAS HUGHES CUDDY.

In the presence of—
G. S. ROXBURGH,
S. GOULD.

Copies of this patent may be obtained for five cents each, by addressing the "Commissioner of Patents, Washington, D. C."